United States Patent
Hirota (10) Patent No.: US 10,651,620 B2
(45) Date of Patent: May 12, 2020

(54) LASER EMITTING DEVICE PROVIDED WITH SHUTTER FOR INTERRUPTING LASER BEAM

(71) Applicant: BROTHER KOGYO KABUSHIKI KAISHA, Nagoya-shi, Aichi (JP)

(72) Inventor: Mitsuo Hirota, Ichinomiya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 316 days.

(21) Appl. No.: 15/718,222

(22) Filed: Sep. 28, 2017

(65) Prior Publication Data
US 2018/0019563 A1    Jan. 18, 2018

Related U.S. Application Data (63) Continuation of application No. PCT/JP2016/059605, filed on Mar. 25, 2016.

(30) Foreign Application Priority Data

Mar. 31, 2015  (JP) ................................. 2015-073925

(51) Int. Cl.
*H01S 3/00*  (2006.01)
*H01S 3/02*  (2006.01)
(Continued)

(52) U.S. Cl.
CPC ............ *H01S 3/0064* (2013.01); *H01S 3/005* (2013.01); *H01S 3/025* (2013.01); *G02B 26/02* (2013.01);
(Continued)

(58) Field of Classification Search
CPC ...... H01S 3/0064; H01S 3/025; H01S 3/0602; H01S 3/0941; H01S 5/2018; H01S 5/2022; H01S 5/10; G02B 26/02
(Continued)

(56) References Cited

U.S. PATENT DOCUMENTS

| 3,648,056 A | * | 3/1972 | Buttweiler | ................. G01J 1/06 250/239 |
| 4,864,098 A | * | 9/1989 | Basanese | ................. H01S 3/005 219/121.61 |

(Continued)

FOREIGN PATENT DOCUMENTS

| JP | S56-147401 U | 4/1980 |
| JP | H09-122963 A | 5/1997 |

(Continued)

OTHER PUBLICATIONS

Thorlabs mechanical drawing "SM1 Lens Tube, 4.00in Deep" (Year: 2015).*

(Continued)

*Primary Examiner* — George G King
(74) *Attorney, Agent, or Firm* — K&L Gates LLP (57) ABSTRACT

A laser emitting device includes: a laser oscillator; an electrical part; a protection member; and a shutter. The laser oscillator is configured to emit a laser beam in an emitting direction. The protection member is interposed between the laser oscillator and the electrical part to shield the laser oscillator. The shutter is disposed to form a prescribed angle with respect to an optical path of the laser beam emitted from the laser oscillator. The shutter is movable between a first position at which the shutter interrupts the laser beam and a second position at which the shutter does not interrupt the laser beam. When the shutter is at the first position, the shutter damps and reflects the laser beam as a reflected beam. The reflected beam advances toward a space between the laser oscillator and the protection member. The reflected beam forms the prescribed angle with respect to the shutter.

6 Claims, 6 Drawing Sheets

(51) Int. Cl.
*G02B 26/02* (2006.01)
*H01S 3/06* (2006.01)
*H01S 3/0941* (2006.01)
*H01S 3/16* (2006.01)

(52) U.S. Cl.
CPC .......... *H01S 3/0602* (2013.01); *H01S 3/0941* (2013.01); *H01S 3/1643* (2013.01)

(58) Field of Classification Search
USPC ........................................................ 359/230
See application file for complete search history.

(56) References Cited

U.S. PATENT DOCUMENTS

| | | | | |
|---|---|---|---|---|
| 6,636,535 | B1* | 10/2003 | Iwashita | G01J 1/4257 356/344 |
| 6,762,866 | B2* | 7/2004 | Carra | B23K 26/06 359/198.1 |

FOREIGN PATENT DOCUMENTS

| | | |
|---|---|---|
| JP | H10-58181 A | 3/1998 |
| JP | 2002-001555 A | 1/2002 |
| JP | 2003-080390 A | 3/2003 |
| JP | 2011-082298 A | 4/2011 |
| JP | 2014-188587 A | 10/2014 |

OTHER PUBLICATIONS

International Preliminary Report on Patentability issued in connection with International Patent Application No. PCT/JP2016/059605, dated Oct. 3, 2017. (6 pages).

Japan Patent Office, International Search Report for PCT Application No. PCT/JP2016/059605 (related to above-captioned patent application), dated Jun. 21, 2016.

Japan Patent Office, Written Opinion for PCT Application No. PCT/JP2016/059605 (related to above-captioned patent application), dated Jun. 21, 2016.

\* cited by examiner

LASER EMITTING DEVICE PROVIDED WITH SHUTTER FOR INTERRUPTING LASER BEAM

CROSS REFERENCE TO RELATED APPLICATION

This application is a continuation application of International Application No. PCT/JP2016/059605 filed Mar. 25, 2016 in the Japan Patent Office acting as Receiving Office, claiming priority from Japanese Patent Application No. 2015-073925 filed Mar. 31, 2015. The entire contents of each of these applications are incorporated herein by reference.

TECHNICAL FIELD

The present disclosure relates to a laser emitting device having a shutter capable of interrupting a laser beam.

BACKGROUND

A laser machining device is configured to machine a workpiece by irradiating a laser beam thereon. A conventional laser emitting device is provided in such laser machining device. As can be understood from the above description, since the laser beam emitted from the laser emitting device is used for machining the workpiece, the laser beam has relatively high energy. Therefore, it is desirable that equipment for safety such as a shutter (light shielding portion) or an absorbing member (attenuator) is provided in the laser emitting device.

One such laser machining device known in the art is provided with a shutter and a beam damper as the equipment for safety (see Japanese Patent Application Publication No. 2002-001555). In the laser machining device, the shutter is disposed on the optical path of a laser beam emitted from the laser oscillator. The laser machining device is configured to interrupt the laser beam with the shutter when a monitoring control device detects an abnormal event. When the optical path of the laser beam is blocked with the shutter, the laser beam is reflected by the shutter and absorbed by the beam damper provided as the absorbing member.

SUMMARY

However, when the beam damper is provided as a separate absorbing member as in the laser machining device described above, a space is required for arranging the beam damper in the laser emitting device, thereby preventing reduction of the size of the laser emitting device. Further, arranging the beam damper as a separate absorbing member requires the cost of the beam damper itself.

On the other hand, if the beam damper as the absorbing member is removed from the laser emitting device, in the laser emitting device having no beam damper, the laser beam reflected by the shutter may be irradiated toward an emitting source of the laser beam (a laser oscillator, for example) while maintaining the energy of the laser beam at a certain level. As described above, since the laser beam has energy capable of machining the workpiece, the heat caused by the laser beam may damage respective components (the laser oscillator, for example) constituting the laser emitting device. Therefore, in the laser emitting device, another configuration for absorbing the laser beam reflected by the shutter is needed when the beam damper as the separate absorbing member is removed.

In view of the foregoing, it is an object of the disclosure to provide a laser emitting device that includes a shutter capable of interrupting a laser beam, and that is capable of ensuring the safety against the laser beam reflected by the shutter and reducing the size of the device.

In order to attain the above and other objects, the present disclosure provides a laser emitting device that includes: a laser source; a laser oscillator; an electrical part; a protection member; a shutter; and a shutter driver. The laser oscillator is configured to emit a laser beam from the laser source in an emitting direction. The electrical part is for controlling the laser beam. The protection member is interposed between the laser oscillator and the electrical part to shield the laser oscillator. The shutter is disposed to form a prescribed angle with respect to an optical path of the laser beam emitted from the laser oscillator. The shutter is movable between a first position at which the shutter interrupts the laser beam and a second position at which the shutter does not interrupt the laser beam. The shutter driver is configured to move the shutter between the first position and the second position. When the shutter is at the first position, the shutter damps and reflects the laser beam as a reflected beam. The reflected beam advances toward a space between the laser oscillator and the protection member. The reflected beam forms the prescribed angle with respect to the shutter.

BRIEF DESCRIPTION OF THE DRAWINGS

The particular features and advantages of the disclosure as well as other objects will become apparent from the following description taken in connection with the accompanying drawings, in which:

FIGS. 5A and 5B are explanatory diagrams illustrating changes in an optical path of a pulsed laser in accordance with a movement of a shutter in the laser emitting device according to the embodiment, in which FIG. 5A illustrates the optical path of the pulsed laser when the shutter is at a first position, and FIG. 5B illustrates the optical path of the pulsed laser when the shutter is at a second position.

DETAILED DESCRIPTION

An embodiment in which a laser emitting device according to the present disclosure is embodied as a laser emitting device 1 will be described while referring to the accompanying drawings wherein like parts and components are designated by the same reference numerals to avoid duplicating description. The laser emitting device 1 according to the present embodiment is configured to emit a pulsed laser L as a laser beam onto a surface of a workpiece and performs two-dimensional scan of the pulsed laser L on the surface of the workpiece, thereby executing marking machining on the surface of the workpiece. The laser emitting device 1 constitutes a laser machining device and a laser machining system for performing a desired marking machining.

Figure 1:
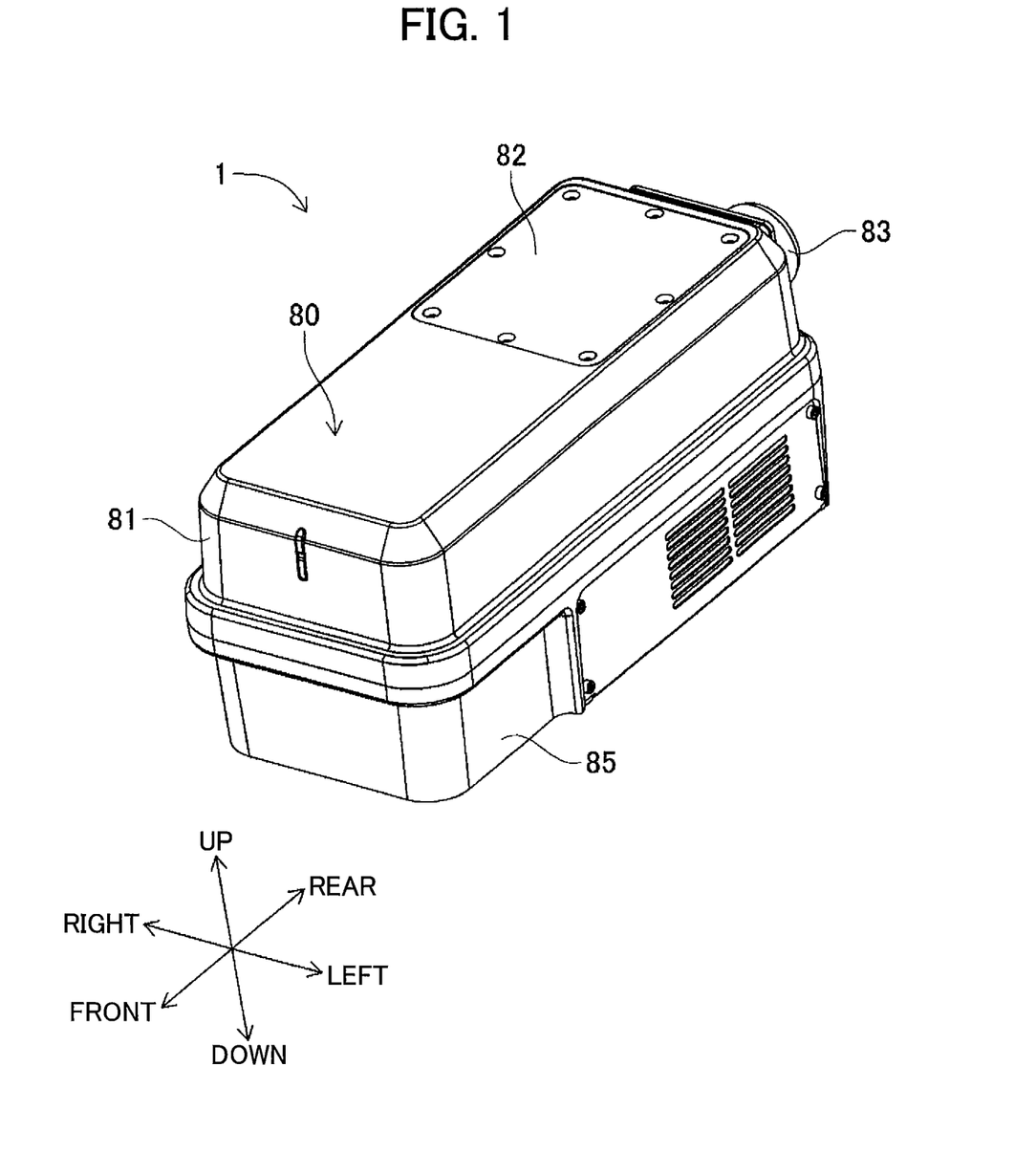
FIG. 1 is a perspective view showing an exterior appearance of a laser emitting device according to an embodiment of the present disclosure.
Figure 2:
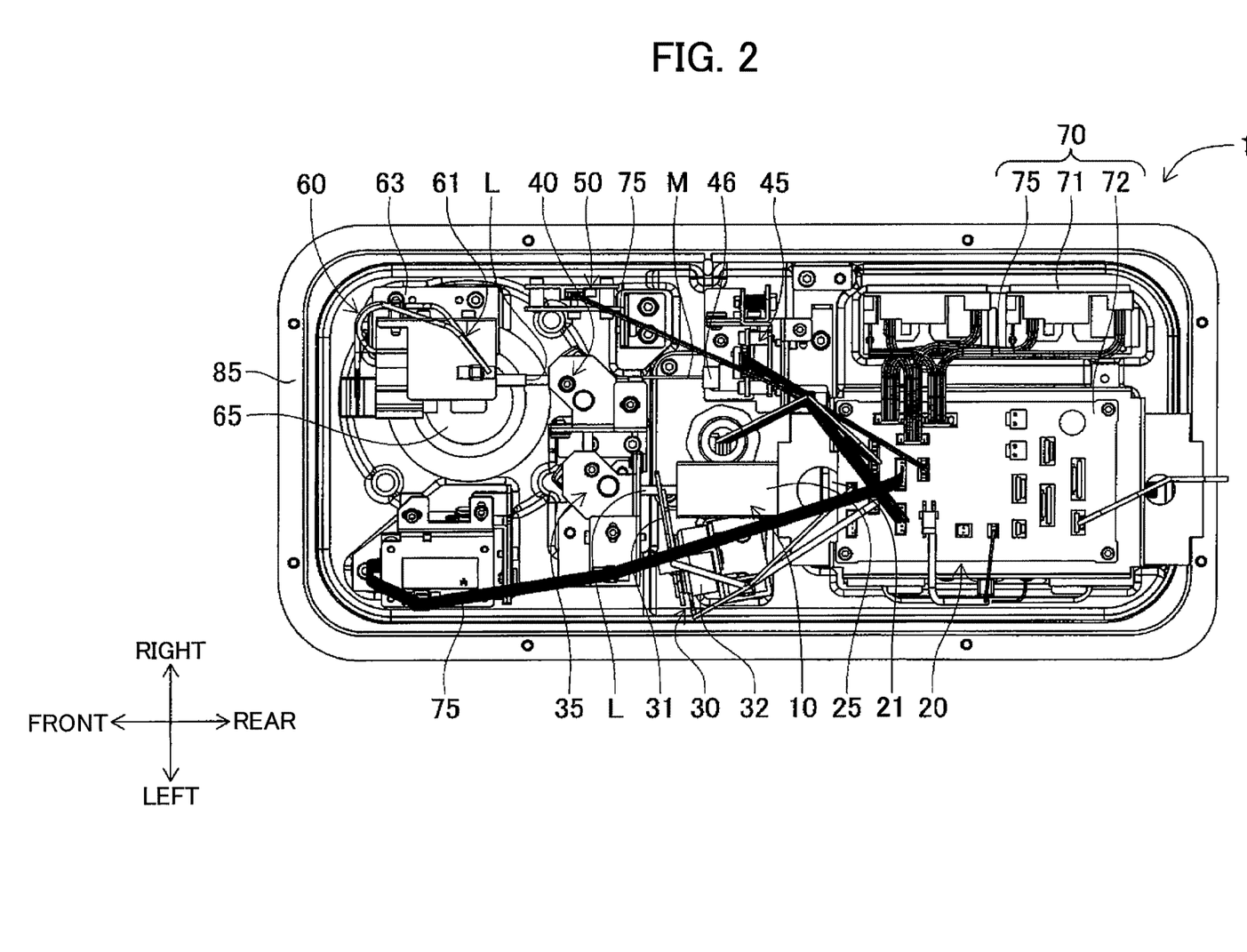
FIG. 2 is a planar view showing an internal configuration of the laser emitting device according to the embodiment.

In the following description, the terms "upward", "downward", "upper", "lower", "above", "below", "right", "left", "front", "rear" and the like will be used throughout the description assuming that the laser emitting device 1 is disposed as shown in FIG. 1. As illustrated in FIG. 2, an emitting direction of the pulsed laser L from a laser oscillator 21 (described later) of the laser emitting device 1 is the frontward direction of the laser emitting device 1. A direction perpendicular to the emitting direction of the pulsed laser L and a main base 85 (described later) of the laser emitting device 1 is the upward/downward direction of the laser emitting device 1. Further, a direction perpendicular to both of the upward/downward direction and the frontward/rearward direction of the laser emitting device 1 is a leftward/rightward direction of the laser emitting device 1.

(Schematic Configuration of Laser Emitting Device)

The laser emitting device 1 according to the present embodiment includes a laser outputting unit 10 and a housing 80. The laser outputting unit 10 is configured to emit a pulsed laser L onto a surface of the workpiece to scan the surface of the workpiece two-dimensionally. The housing 80 accommodates the laser outputting unit 10 therein.

Figure 3:
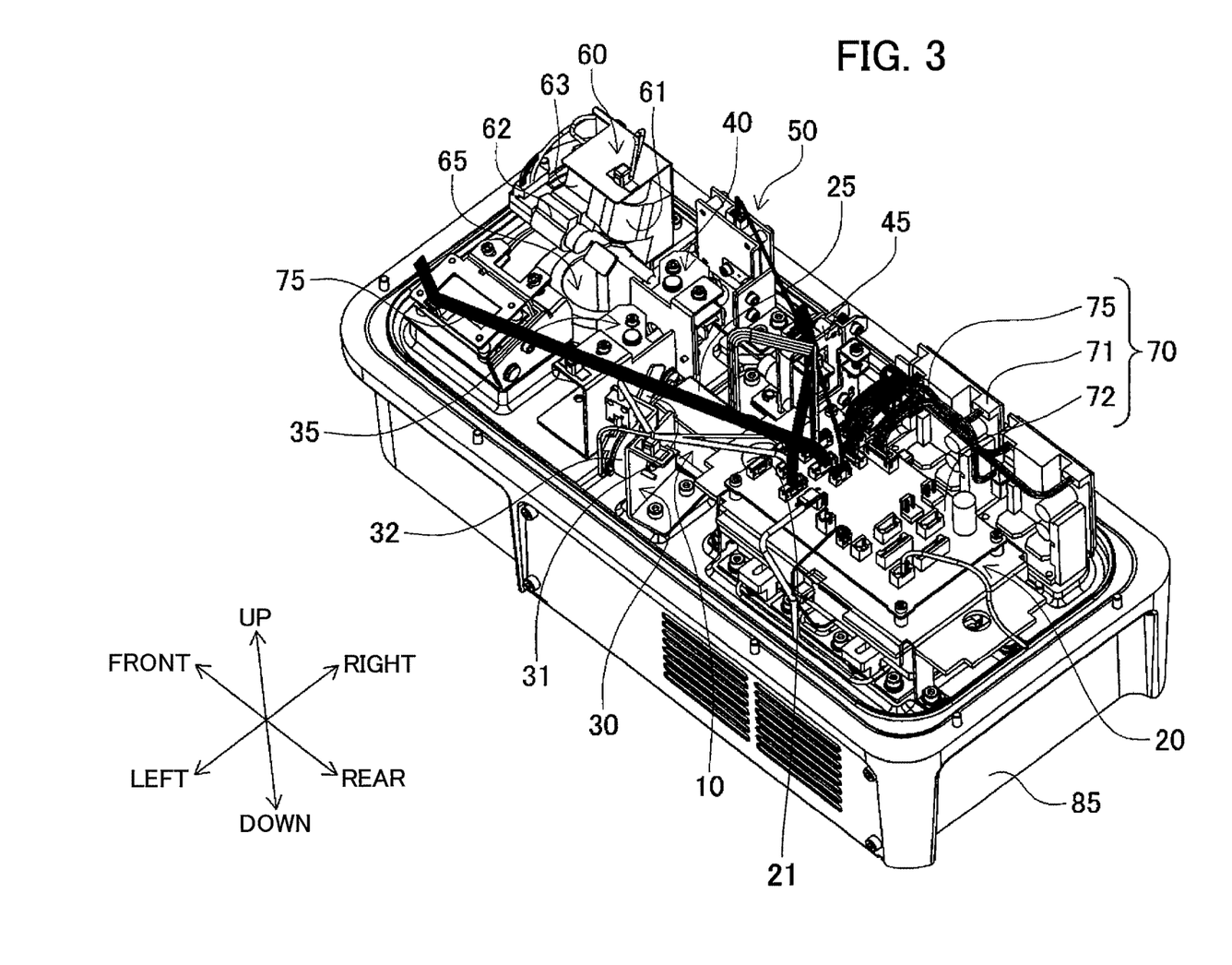
FIG. 3 is a perspective view showing the internal configuration of the laser emitting device according to the embodiment.

As illustrated in FIGS. 1 through 3, the laser outputting unit 10 includes a laser oscillation unit 20, a protection member 25, a light shutter 30, a first mirror 35, a second mirror 40, a guide optical section 45, an optical sensor 50, a galvano scanner 60, an fθ lens 65, and an electrical part 70. The laser oscillation unit 20 emits a pulsed laser L, and the laser outputting unit 10 controls the galvano scanner 60 to perform two-dimensional scan of the pulsed laser L emitted from the laser oscillation unit 20 on the surface of the workpiece.

The housing 80 is formed in a substantially cuboid shape, and is capable of accommodating the laser outputting unit 10 therein. The housing 80 includes a main cover 81, a cover member 82, a wiring insertion portion 83, and the main base 85. The main cover 81 constitutes an upper portion of the housing 80, and the main base 85 constitutes a lower portion of the housing 80. The main cover 81 is formed in a substantially box shape, and is open at its lower surface (on the side of the main base 85). The laser outputting unit 10 is disposed on the main base 85. The main cover 85 accommodates the laser outputting unit 10 therein by covering the laser outputting unit 10 from above.

An opening has a substantially rectangular shape in a planar view, and is formed in the upper surface of the main cover 81 at the rear portion thereof. The opening is located at a prescribed region directly above the laser oscillation unit 20. The cover member 82 is attached to the main cover 81 with screws to cover the opening. The cover member 82 has a substantially rectangular plate-like shape in a planar view.

The wiring insertion portion 83 is provided in the rear surface of the main cover 81. The wiring insertion portion 83 is located behind the laser oscillation unit 20, and is open at its opposed portion opposed to the laser oscillation unit 20. Cables electrically connected with a laser controller (not shown) and a power unit (not shown) and an optical fiber connected with a semiconductor laser pumping unit (not shown) are inserted into the wiring insertion portion 83.

(Specific Configuration of Laser Outputting Unit)

As illustrated in FIGS. 1 through 4, the laser oscillation unit 20 includes the laser oscillator 21 and a beam expander 22. The laser oscillator 21 has a fiber connector, a condenser lens, a reflection mirror, a laser medium, a passive Q-switch, an output coupler, and a window, which are accommodated in a casing. The fiber connector is in communication with the optical fiber which is pulled into the inside of the housing 80 via the wiring insertion portion 83. Pump light emitted from the semiconductor laser pumping unit is incident upon the fiber connector via the optical fiber.

The condenser lens concentrates the pump light incident from the fiber connector. The reflection mirror allows the pump light concentrated by the condenser lens to pass therethrough and simultaneously reflects a laser beam emitted from the laser medium at high efficiency. The laser medium is pumped by the pump light emitted from the semiconductor laser pumping unit to oscillate the laser beam. For example, neodymium doped gadolinium vanadate (Nd:GdVO4) crystal to which neodymium (Nd) is doped as a laser active ion, neodymium doped yttrium vanadate (Nd:YVO4) crystal, and neodymium doped yttrium aluminum garnet (Nd:YAG) crystal may be used as the laser medium.

The passive Q-switch is crystal having properties that a penetration rate becomes greater when optical energy stored therein exceeds a certain value. Thus, the passive Q-switch functions as a Q-switch for oscillating the laser beam oscillated from the laser medium as a pulsed laser L having a pulse shape. For example, chrome doped YAG (Cr:YAG) crystal and Cr:MgSiO4 crystal may be used as the passive Q-switch.

The output coupler constitutes the reflection mirror and a laser resonator. The output coupler is, for example, a partial reflection mirror configured of a concave mirror having a surface coated with a dielectric multi-layer film. The partial reflection mirror has a reflection rate from 80% to 95% in a wavelength of 1064 nm. The window is formed of synthetic silica and the like, and allows the laser beam emitted from the output coupler to pass therethrough outwardly. Thus, the laser oscillator 21 oscillates the pulsed laser through the passive Q-switch, and outputs the pulsed laser L as the laser beam for performing the marking machining on the surface of the workpiece.

Figure 4:
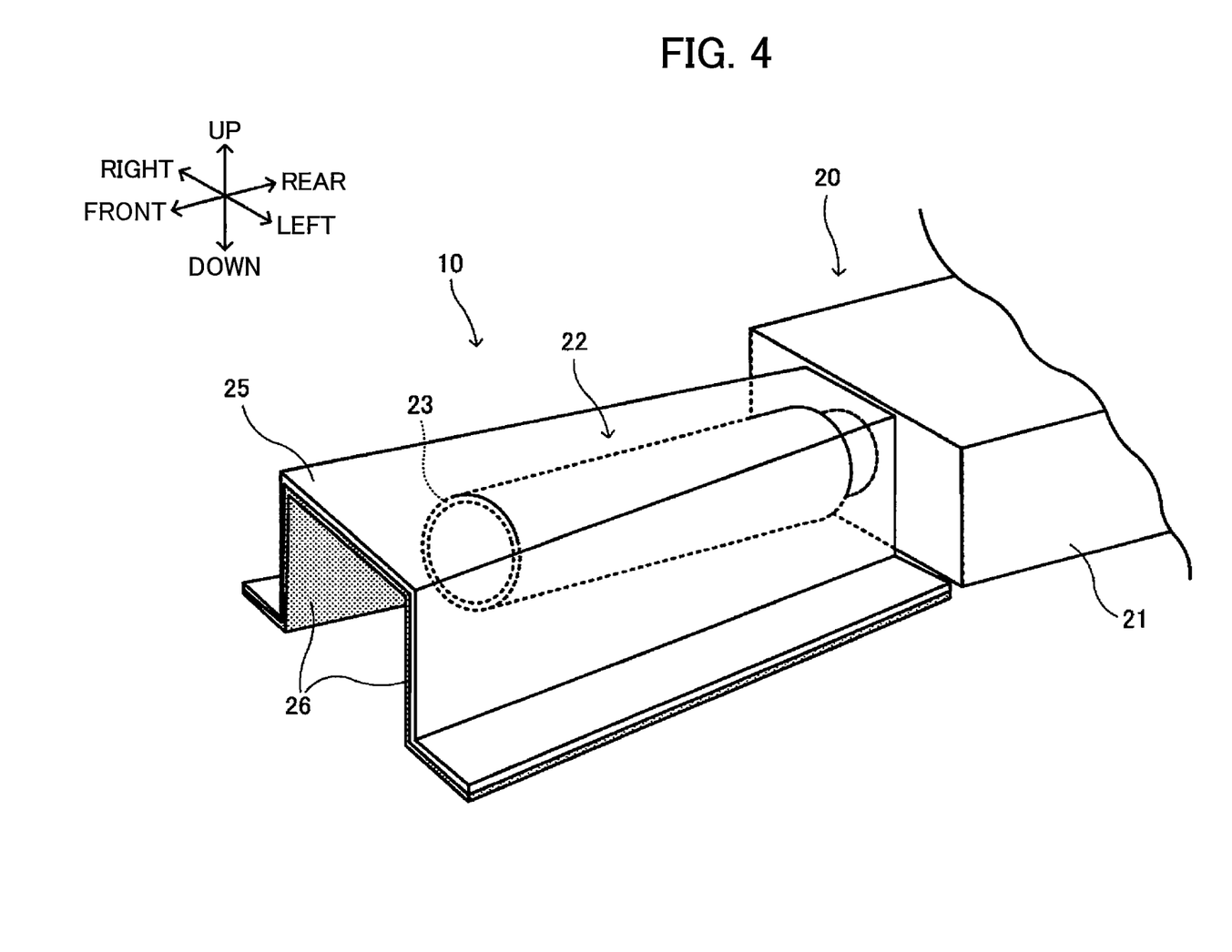
FIG. 4 is an explanatory diagram illustrating a configuration of a protection member in the laser emitting device according to the embodiment.
Figure 5A:
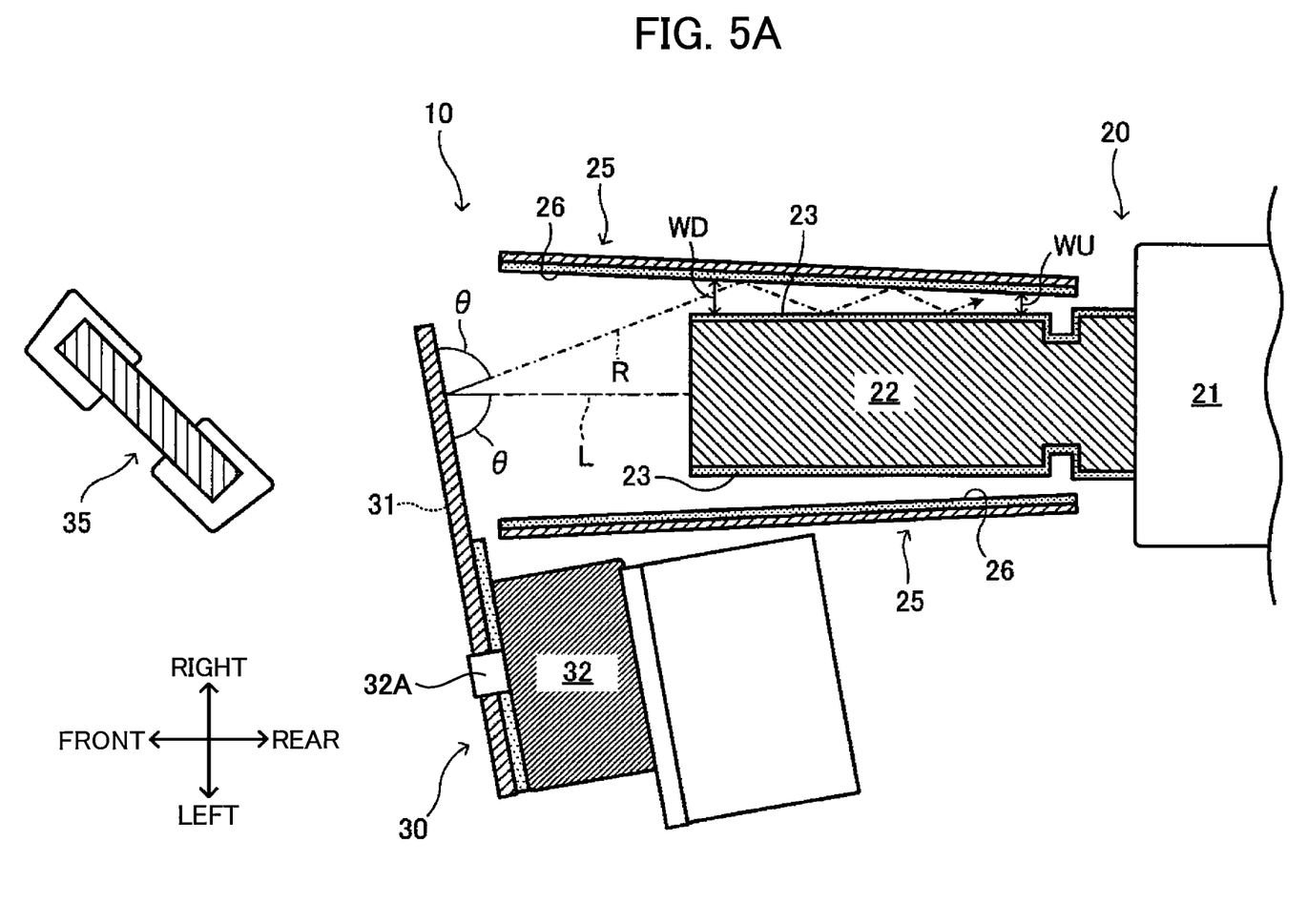
Figure 5B:
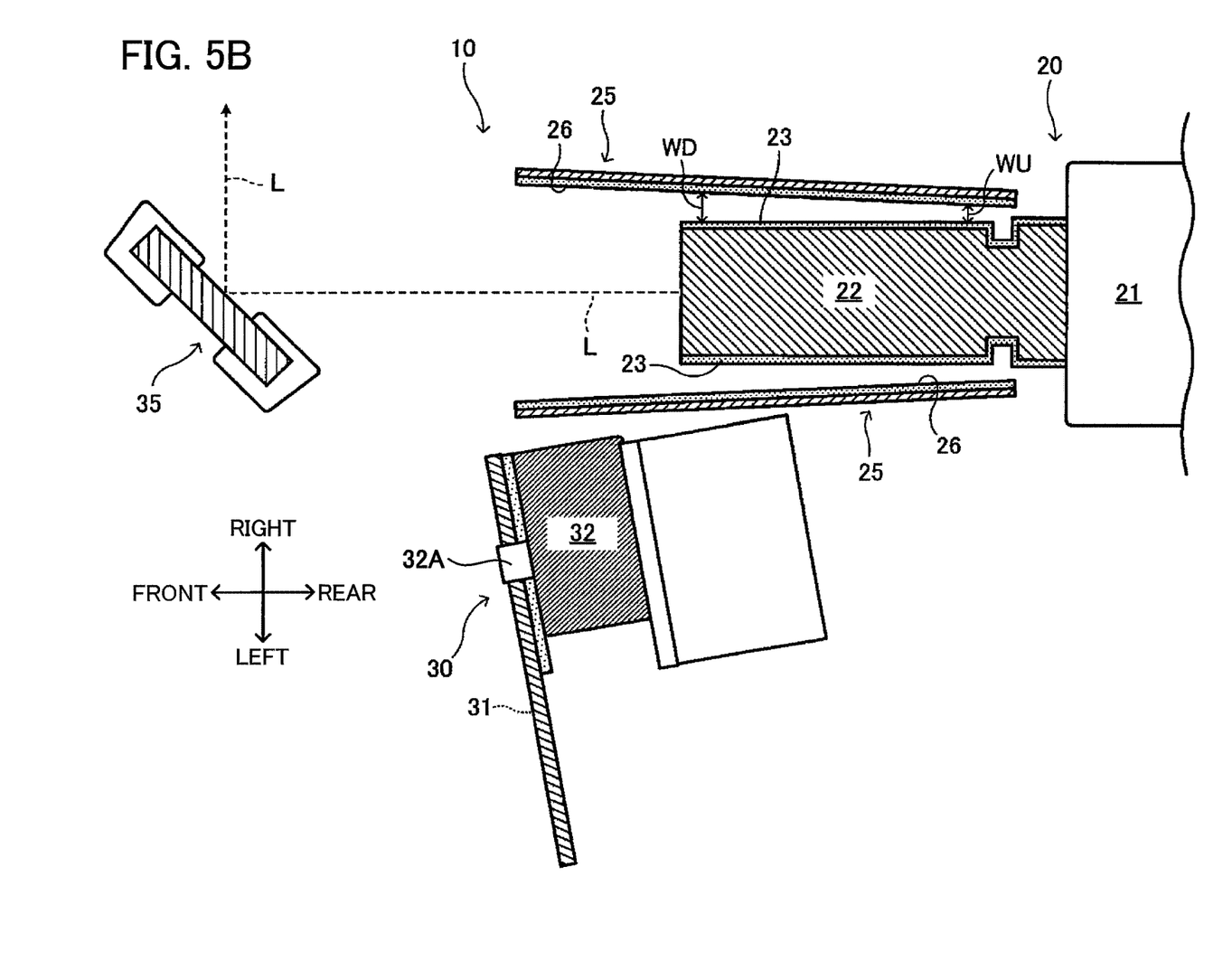

The beam expander 22 changes a beam diameter of the pulsed laser L, and is attached in coaxial relation to the axis of the laser oscillator 21. As illustrated in FIGS. 4 and 5, a light-absorbing layer 23 is formed on the outer surface of the beam expander 22. More specifically, the light-absorbing layer 23 is formed by applying a black matting alumite treatment to the outer surface of the beam expander 22. The light-absorbing layer 23 is capable of absorbing reflected light R of the pulsed laser L reflected from a shutter 31 (described later) constituting the light shutter 30.

The protection member 25 is formed by bending a plate material made of metal, and is arranged to cover the beam expander 22 of the laser oscillation unit 20. The protection member 25 is interposed between the beam expander 22 and distribution cables 75 constituting the electrical part 70 on the upper, right, and left sides of the beam expander 22 (see FIGS. 2 and 3). Accordingly, the protection member 25 prevents the entrance of the distribution cables 75 into an optical path of the pulsed laser L and the reflected light R.

As illustrated in FIGS. 4 and 5, a light-absorbing layer 26 is formed on the inner surface of the protection member 25. The inner surface of the protection member 25 is a surface opposed to the outer surface of the beam expander 22. The light-absorbing layer 26 is formed by applying a black matting alumite treatment to the inner surface of the protection member 25, as with the light-absorbing layer 23 formed on the beam expander 22. The light-absorbing layer 26 is capable of absorbing the reflected light R of the pulsed laser L reflected from the shutter 31.

Further, the protection member 25 according to the present embodiment is formed so that the distance between the outer surface of the beam expander 22 and the inner surface of the protection member 25 in the leftward/rightward direction becomes greater toward the front of the laser emitting device 1. More specifically, assuming that an upstream-side distance WU is the distance in the leftward/rightward direction between the outer surface of the beam expander 22 and the inner surface of the protection member 25 at a position on the upstream side in the emitting direction of the pulsed laser L, and a downstream-side distance WD is the distance in the leftward/rightward direction between the outer surface of the beam expander 22 and the inner surface of the protection member 25 at another position on the downstream side in the emitting direction of the pulsed laser L, the protection member 25 is formed so that the upstream-side distance WU is smaller than the downstream-side distance WD, as illustrated in FIGS. 5A and 5B. In other words, the left side wall of the protection member 25 leans to the right as a position on the left side wall is far from the shutter 31, and the right side wall of the protection member 25 leans to the left as a position on the right side wall is far from the shutter 31.

The light shutter 30 includes the shutter 31 and a shutter motor 32. The shutter 31 has a plate shape. In the present embodiment, the shutter 31 has a substantially rectangular plate shape, and a through-hole is formed at an off-center position of the shutter 31. The shutter motor 32 is configured of a stepping motor and the like, and has a motor shaft 32A. The shutter 31 is attached to the motor shaft 32A so that the motor shaft 32A is inserted into the through-hole of the shutter 31, and coaxially rotates with the shutter motor 32. The shutter motor 32 rotates prescribed degrees about the center of the motor shaft 32A, and the shutter 31 is rotated between a first position (FIG. 5A) and a second position (FIG. 5B) with the rotation of the shutter motor 32. In the present embodiment, the shutter motor 32 rotates 180 degrees while the shutter 31 is moved between the first position and the second position. Note that the present disclosure is not limited to this. For example, the shutter motor 32 may rotate 90 degrees.

As illustrated in FIG. 5A, when the shutter 31 is rotated and positioned at the first position where the optical path (drawn by an alternate long and short dash line in FIG. 5A) of the pulsed laser L emitted from the beam expander 22 is blocked with the shutter 31, the shutter 31 is disposed so that the surface of the shutter 31 is oriented to form a predetermined angle θ with respect to the frontward/rearward direction parallel to the optical path of the pulsed laser L. As a result, the shutter 31 damps the pulsed laser L from the laser oscillation unit 20 and reflects the pulsed laser L as the reflected light R (drawn by a dashed-dotted line in FIG. 5A) toward a space between the outer surface of the beam expander 22 and the inner surface of the protection member 25 (see FIG. 5A). The rotating operation of the shutter 31 to the first position will be called as an opening operation of the shutter 31. As illustrated in FIG. 5B, when the shutter 31 is rotated and positioned at the second position out of the optical path (drawn by a dashed line in FIG. 5B) of the pulsed laser L emitted from the beam expander 22, on the other hand, the pulsed laser L emitted from the beam expander 22 is incident upon a first mirror 35 which is located in front of the beam expander 22. The rotating operation of the shutter 31 to the second position will be called as a closing operation of the shutter 31.

As described above, since the shutter 31 is attached to the motor shaft 32A of the shutter motor 32 and coaxially rotates with the same, the angle of the surface of the shutter 31 with respect to the optical path of the pulsed laser L can be maintained at the predetermined angle θ during movement of the shutter 31 between the first position and the second position.

The first mirror 35 is disposed so that the surface of the first mirror 35 is oriented to form 45 degrees with respect to the frontward/rearward direction parallel to the optical path of the pulsed laser L. The first mirror 35 reflects the pulsed laser L toward the second mirror 40 disposed at a right-side position relative to the first mirror 35.

The second mirror 40 is disposed so that the surface of the second mirror 40 is oriented to form 45 degrees with respect to the rightward direction parallel to the optical path of the pulsed laser L reflected upon the first mirror 35. The second mirror 40 is configured of a half mirror. The second mirror 40 reflects a part of the pulsed laser L reflected upon the first mirror 35 toward the galvano scanner 60 disposed at a front-side position relative to the second mirror 40. In addition, the second mirror 40 reflects the remaining part of the pulsed laser L reflected upon the first mirror 35 toward the optical sensor 50 disposed at a right-side position relative to the second mirror 40.

The guide optical section 45 includes a visible semiconductor laser 46 and a lens array (not shown). The visible semiconductor laser 46 irradiates a visible laser beam M, such as a red laser beam, and the lens array collimates the visible laser beam M emitted from the visible semiconductor laser 46 into a parallel beam. The visible laser beam M has a wave length different from that of the pulsed laser L irradiated from the laser oscillator 21. The guide optical section 45 is disposed at a rear-side position relative to the second mirror 40 so that an optical axis of the visible laser beam M coincides with the optical path of the pulsed laser L reflected upon the first mirror 35. The visible semiconductor laser 46 irradiates the visible laser beam M along the optical path of the pulsed laser L. The visible laser beam M emitted from the guide optical section 45 in the frontward direction penetrates through the second mirror 40 toward the galvano scanner 60 disposed at a front-side position relative to the second mirror 40.

The optical sensor 50 is configured of a photodiode capable of detecting emission intensity of the pulsed laser L and the like. The optical sensor 50 detects output intensity of the pulsed laser L which is reflected upon the first mirror 35 and penetrates through the second mirror 40. In this manner, the output intensity of the pulsed laser L outputted from the laser oscillator 21 can be detected with the optical sensor 50.

An opening is formed in a front portion of the main base 85. The galvano scanner 60 is disposed above the opening of the main base 85 and directs the pulsed laser L emitted from the laser oscillation unit 20 and the visible laser beam M that penetrates through the second mirror 40 downward through the opening and performs two-dimensional scan. More specifically, the galvano scanner 60 includes a galvano X-axis motor 61, a galvano Y-axis motor 62, and a main unit 63. The motor shafts of the galvano X-axis motor 61 and the galvano Y-axis motor 62 are inserted into the respective openings formed in the main unit 63, and are arranged orthogonal to each other. A scan mirror is movable attached to the tip end of each motor shaft.

Thus, in the galvano scanner 60, the two scan mirrors diagonally face each other and perform two-dimensional scans while moving in cooperation with each other. Controlling the rotations of the galvano X-axis motor 61 and the galvano Y-axis motor 62 changes the reflecting angles of the respective scan mirrors. As a result, the pulsed laser L and the visible laser beam M are directed downward and perform two-dimensional scans for scanning the pulsed laser L and the visible laser beam M frontward/rearward direction (X direction) and leftward/rightward direction (Y direction).

The fθ lens 65 operates to coaxially collimate the two-dimensionally scanning pulsed laser L and visible laser beam M onto the surface of the workpiece disposed below the fθ lens 65. The fθ lens 65 converges the pulsed laser L and the visible laser beam M into a focal point that is a planate focal plane, and adjusts the pulsed laser L and the visible laser beam M so as to regulate the constant scanning speed of the pulsed laser L and the visible laser beam M. In this manner, by controlling the rotations of the galvano X-axis motor 61 and the galvano Y-axis motor 62, the pulsed laser L and the visible laser beam M perform two-dimensional scan in both frontward/rearward direction (X direction) and leftward/rightward direction (Y direction) on the surface of the workpiece, thereby forming a desired machining pattern on the workpiece.

The electrical part 70 includes a control board for controlling various components in the laser outputting unit 10, and wiring for transmitting control signals and supplying electric power. The electrical part 70 is constituted with a galvano driver 71, a relay board 72, the distribution cables 75, and the like.

Power is supplied to the galvano driver 71 via a supply cable (not shown), and control signals are inputted to the galvano driver 71 via the distribution cables 75. In this way, the galvano driver 71 controls and drives the galvano scanner 60. The galvano driver 71 is disposed at a right-side position in a rear portion of the main base 85 to stand in the upward/downward direction, and at a right-side position relative to the laser oscillator 21. The galvano driver 71 is arranged confronting and in parallel with the laser oscillator 21 at a predetermined interval.

The relay board 72 is disposed above the laser oscillator 21 in the laser oscillation unit 20. The relay board 72 is a board for relaying various external devices (the power unit, for example) located outside of the housing 80 and various components in the laser outputting unit 10 in order to connect the external devices with the components electrically. The distribution cables 75 pulled into the inside of the housing 80 via the wiring insertion portion 83 and the distribution cables 75 connected to the optical sensor 50, the galvano driver 71, and the like are connected with the relay board 72.

(Changes in Optical Path of Pulsed Laser L Accompanying Opening and Closing Operations of Shutter)

Next, change in the optical path of the pulsed laser L that accompanies opening and closing operations of the light shutter 30 in the laser emitting device 1 according to the above-described configuration will be described in detail with reference to the drawings. In the present embodiment, when the shutter 31 of the light shutter 30 is positioned at the first position, the surface of the shutter 31 damps the pulsed laser L emitted from the laser oscillation unit 20 and reflects the pulsed laser L as the reflected light R so that the reflected light R is oriented to form the angle θ with respect to the surface of the shutter 31.

As illustrated in FIG. 5A, the reflected light R oriented to form the angle θ with respect to the surface of the shutter 31 is reflected toward the space between the outer surface of the beam expander 22 and the inner surface of the protection member 25. The more downstream in the emitting direction of the pulsed laser L (that is, the frontward direction in the laser emitting device 1), the wider the space between the outer surface of the beam expander 22 and the inner surface of the protection member 25 is, and the more upstream in the emitting direction of the pulsed laser L (that is, the rearward direction in the laser emitting device 1), the narrower the space is.

As a result, the laser emitting device 1 easily guides the reflected light R reflected by the shutter 31 at the first position into the space between the outer surface of the beam expander 22 and the inner surface of the protection member 25 (that is, in the example illustrated in FIG. 5A, the space between the outer surface of the beam expander 22 and the inner surface of the right side wall of the protection member 25). Further, the reflected light R incident into the space between the outer surface of the beam expander 22 and the inner surface of the protection member 25 is reflected while being absorbed by the light-absorbing layer 23 in the beam expander 22 and the light-absorbing layer 26 in the protection member 25, and advances in the rearward direction of the laser emitting device 1. At this time, since the distance between the outer surface of the beam expander 22 and the inner surface of the protection member 25 in the leftward/rightward direction becomes smaller toward the upstream side in the emitting direction, the absorption of the reflected light R of the pulsed laser L by the light-absorbing layer 23 and the light-absorbing layer 26 can grow in frequency, and the intensity of the reflected light R of the pulsed laser L can be reduced. Accordingly, the safety of the laser emitting device 1 can be sufficiently ensured.

Further, since the shutter 31 is attached to the motor shaft 32A of the shutter motor 32 and coaxially rotates with the same, the angle of the surface of the shutter 31 with respect to the optical path of the pulsed laser L can be maintained at the angle θ while the shutter 31 moves between the first position and the second position. In other words, the angle θ between the surface of the shutter 31 and the optical path of the pulsed laser L does not fluctuate while the shutter 31 moves between the first position and the second position. Thus, the laser emitting device 1 according to the above-described configuration can certainly reflect the pulsed laser L to direct the reflected light R toward the space between the outer surface of the beam expander 22 and the inner surface of the protection member 25, thereby preventing the reflected light R from being reflected to an unexpected position to cause damage to the various components of the laser emitting unit 10 (the electrical part 70, for example).

As described above, the laser emitting device 1 according to the present embodiment includes the laser oscillation unit 20 having the laser oscillator 21 and the beam expander 22, the light shutter 30 having the shutter 31 and the shutter motor 32, the protection member 25, and the electrical part 70, and can interrupt the pulsed laser L from the laser oscillation unit 20 by moving the shutter 31 to the first position so as to block the optical path of the pulsed laser L.

As illustrated in FIG. 5A, when the shutter 31 is positioned at the first position, the shutter 31 damps the pulsed laser L and reflects the pulsed laser L as the reflected light R, thereby guiding the reflected light R into the space between the beam expander 22 and the protection member 25. Thus, the laser emitting device 1 according to the present embodiment can damp the reflected light R while the pulsed laser L is reflected by the shutter 31 and is further reflected in the space between the beam expander 22 and the protection member 25. Accordingly, the safety of the laser emitting device 1 can be sufficiently ensured and damage to the laser oscillation unit 20 and the like can be prevented.

In addition, the protection member 25 is interposed between the beam expander 22 and the distributing cables 75 of the electrical part 70 so that the protection member 25 shields the beam expander 22 (see FIG. 4). Thus, the protection member 25 is part of the configuration for ensuring the safety of the laser emitting device 1. In other words, according to the laser emitting device 1, the safety of the laser emitting device 1 can be ensured without providing dedicated components for absorbing the reflected light R of the pulsed laser L (a light damper, for example). Therefore, the size of the laser emitting device 1 can be maintained or reduced.

Further, the protection member 25 has the light-absorbing layer 26 on the inner surface thereof, and the reflected light R of the pulsed laser L reflected by the shutter 31 is incident into the space between the beam expander 22 and the protection member 25. Thus, the reflected light R can be incident upon the light-absorbing layer 26 formed on the inner surface of the protection member 25 (see FIG. 5A). In other words, according to the laser emitting device 1, the reflected light R of the pulsed laser L can be absorbed in the light-absorbing layer 26 formed on the protection member 25, thereby sufficiently ensuring the safety of the laser emitting device 1.

Further, the beam expander 22 has the light-absorbing layer 34 on the outer surface thereof, and the reflected light R of the pulsed laser L reflected by the shutter 31 is incident into the space between the beam expander 22 and the protection member 25. Thus, the reflected light R can be incident upon the light-absorbing layer 34 formed on the outer surface of the beam expander 22 (see FIG. 5A). In other words, according to the laser emitting device 1, the reflected light R of the pulsed laser L can be absorbed in the light-absorbing layer 34 of the beam expander 22, thereby sufficiently ensuring the safety of the laser emitting device 1.

As illustrated in FIG. 5A, the reflected light R of the pulsed laser L reflected by the shutter 31 is incident into the space between the beam expander 22 and the protection member 25 and advances toward the upstream side in the emitting direction (the rearward direction in the laser emitting device 1) while being reflected by the outer surface of the beam expander 22 and the inner surface of the protection member 25. Here, according to the laser emitting device 1, the more upstream in the emitting direction of the pulsed laser L in the laser oscillation unit 20, the smaller the distance between the beam expander 22 and the protection member 25 in the leftward/rightward direction (the upstream-side distance WU and the downstream-side distance WD) is. Accordingly, the laser emitting device 1 causes reflection more frequently as the reflected light R advances upstream in the emitting direction, thereby damping the reflected light R. In other words, the laser emitting device 1 according to the present embodiment can damp the reflected light R of the pulsed laser L more as the reflected light R advances upstream in the emitting direction, thereby sufficiently ensuring the safety of the laser emitting device 1.

In the present embodiment, the electrical part 70 includes the galvano driver 71, the relay board 72, and the distribution cables 75, and the protection member 25 prevents the entrance of the distribution cables 75 into the optical path of the pulsed laser L and the reflected light R. According to the laser emitting device 1, the protection member 25 for preventing the entrance of the distribution cables 75 into the optical path of the pulsed laser L can be used as a component for ensuring the safety of the laser emitting device 1. That is, in the laser emitting device 1, the safety of the laser emitting device 1 can be ensured without providing dedicated components for absorbing the reflected light R of the pulsed laser L (a light damper, for example).

In addition, in the present embodiment, since the shutter 31 is attached to the motor shaft 32A of the shutter motor 32 and coaxially rotates with the shutter motor 32, the angle formed between the surface of the shutter 31 and the optical path of the pulsed laser L is maintained at the angle θ while the shutter 31 moves between the first position and the second position. Thus, since the angle θ of the surface of the shutter 31 with respect to the optical path of the pulsed laser L does not fluctuate, the laser emitting device 1 can certainly reflect the reflected light R toward the space between the outer surface of the beam expander 22 and the inner surface of the protection member 25 even while the shutter 31 moves between the first position and the second position. Accordingly, the laser emitting device 1 can prevent the reflected light R from being reflected to an unexpected position to cause damage to the various components of the laser emitting unit 10 (the electrical part 70, for example).

In the above-described embodiment, the laser emitting device 1 is an example of the laser emitting device of the present disclosure. The laser oscillation unit 20 and the laser oscillator 21 are examples of the laser source of the present disclosure. The laser oscillation unit 20 and the beam expander 22 are examples of the laser oscillator of the present disclosure. The light-absorbing layer 23 is an example of the light-absorbing layer of the laser oscillator of the present disclosure, and the light-absorbing layer 26 is an example of the light-absorbing layer of the protection member of the present disclosure. The shutter 31 is an example of the shutter of the present disclosure, and the shutter motor 32 is an example of the shutter driver of the present disclosure. The galvano driver 71 and the relay board 72 are examples of the board of the present disclosure, and the distribution cables 75 are examples of the wiring of the present disclosure. The pulsed laser L is an example of the laser beam of the present disclosure, and the reflected light R is an example of the reflected light of the present disclosure.

While the description has been made in detail with reference to specific embodiment, it would be apparent to those skilled in the art that various changes and modifications may be made thereto. For example, in the embodiment described above, the light-absorbing layer 23 and the light-absorbing layer 26 are respectively formed on the outer surface of the beam expander 22 and the inner surface of the protection member 25, but the present disclosure is not limited to this configuration. The light-absorbing layer may be formed on either one of the outer surface of the beam expander 22 and the inner surface of the protection member 25.

In the embodiment described above, the light-absorbing layer is formed by applying the black matting alumite treatment, the present disclosure is not limited to this configuration. Various configurations capable of absorbing the reflected light R may be employed as the light-absorbing layer of the present disclosure.

Further, in the embodiment described above, the beam expander 22 and the protection member 25 are arranged so that the distance between the beam expander 22 and the protection member 25 becomes smaller toward the upstream side in the emitting direction of the pulsed laser L in the laser oscillation unit 20. However, the present disclosure is not limited to this configuration. For example, the outer surface of the beam expander 22 and the inner surface of the protection member 25 may be parallel to each other so that the distance between the beam expander 22 and the protection member 25 is maintained at a constant.

Further, in the embodiment described above, the light shutter 30 opens/blocks the optical path of the pulsed laser L by rotating the shutter 31 along with the motor shaft 32A of the shutter motor 32. However, the present disclosure is not limited to this configuration. Various configurations capable of opening and blocking the optical path of the pulsed laser L by moving the shutter 31 may be employed. For example, the shutter 31 may be rotated or slid by a solenoid.

What is claimed is:

1. A laser emitting device comprising:
    a laser source;
    a laser oscillator unit configured to emit a laser beam from the laser source in an emitting direction;
    an electrical part for controlling the laser beam;
    a protection member interposed between the laser oscillator unit and the electrical part, the protection member having an inverse tapered shape in the emitting direction and being arranged to cover at least part of the laser oscillator unit, the protection member having an inner surface facing an outer surface of the laser oscillator unit;
    a shutter disposed to form a prescribed angle with respect to an optical path of the laser beam emitted from the laser oscillator unit, the shutter being movable between a first position at which the shutter interrupts the laser beam and a second position at which the shutter does not interrupt the laser beam; and
    a shutter driver configured to move the shutter between the first position and the second position,
    wherein when the shutter is at the first position, the shutter damps and reflects the laser beam as a reflected beam forming the prescribed angle with respect to the shutter, the reflected beam advancing toward a space between the laser oscillation unit and the protection member and being further reflected by the outer surface of the beam oscillation unit and the inner surface of the protection member, and
    wherein a light-absorption layer is formed on the inner surface of the protection member to enable absorption of the reflected beam.

2. The laser emitting device according to claim 1, wherein the light-absorption layer is also formed on the outer surface of the laser oscillator unit to enable absorption of the reflected beam.

3. The laser emitting device according to claim 1, wherein a first distance is smaller than a second distance, where the first distance is a distance between the laser oscillator unit and the protection member at an upstream position in the emitting direction and the second distance is a distance between the laser oscillator unit and the protection member at a downstream position in the emitting direction, the upstream position being more upstream than the downstream position in the emitting direction.

4. The laser emitting device according to claim 3, wherein the distance between the laser oscillator unit and the protection member gradually decreases as a position on the protection member is far from the shutter.

5. The laser emitting device according to claim 1, wherein the electrical part comprises:
    a board on which electrical components are mounted in order to emit the laser beam under control; and
    a wiring extending from the board for connection of the electrical components with any of the laser source, the laser oscillator unit, and the shutter driver,
    wherein the protection member is disposed to prohibit the wiring from entering into the optical path.

6. The laser emitting device according to claim 1, wherein an angle between the shutter and the optical path is maintained at the prescribed angle while the shutter moves between the first position and the second position.

* * * * *